US010389745B2

(12) United States Patent
Mueen et al.

(10) Patent No.: US 10,389,745 B2
(45) Date of Patent: Aug. 20, 2019

(54) SYSTEM AND METHODS FOR DETECTING BOTS REAL-TIME

(71) Applicant: STC.UNM, Albuquerque, NM (US)

(72) Inventors: Abdullah Mueen, Albuquerque, NM (US); Nikan Chavoshi, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 15/750,236

(22) PCT Filed: Aug. 4, 2016

(86) PCT No.: PCT/US2016/045554
§ 371 (c)(1),
(2) Date: Feb. 5, 2018

(87) PCT Pub. No.: WO2017/027320
PCT Pub. Date: Feb. 16, 2017

(65) Prior Publication Data
US 2018/0234447 A1    Aug. 16, 2018

Related U.S. Application Data

(60) Provisional application No. 62/202,442, filed on Aug. 7, 2015.

(51) Int. Cl.
*G06F 11/00*    (2006.01)
*G06F 12/14*    (2006.01)
(Continued)

(52) U.S. Cl.
CPC ...... *H04L 63/1425* (2013.01); *G06F 16/2255* (2019.01); *G06F 21/577* (2013.01);
(Continued)

(58) Field of Classification Search
CPC ........... H04L 2463/144; H04L 63/1408; H04L 63/1425; G06F 2221/034; G06F 21/577; G06Q 50/01
See application file for complete search history.

(56) References Cited

U.S. PATENT DOCUMENTS 8,056,132 B1 * 11/2011 Chang ................... G06F 21/552
                                                713/187
2008/0114837 A1 * 5/2008 Biggs ................... G06F 17/2765
                                                709/206
(Continued)

FOREIGN PATENT DOCUMENTS

RU          2445694 C2    3/2012
WO      2012107879 A2    8/2012

OTHER PUBLICATIONS

Dickerson et al., Using Sentiment to Detect Bots on Twitter: Are Humans more Opinionated than Bots? (Year: 2014).*
(Continued)

*Primary Examiner* — Trong H Nguyen
(74) *Attorney, Agent, or Firm* — Valauskas Corder LLC (57) ABSTRACT

Bots are detected real-time by correlating activity between users using a lag-sensitive hashing technique that captures warping-invariant correlation. Correlated users groups in social media may be found that represent bot behavior with thousands of bot accounts detected in a couple of hours.

20 Claims, 10 Drawing Sheets

(51) Int. Cl.
  *G06F 12/16*    (2006.01)
  *G08B 23/00*    (2006.01)
  *H04L 29/06*    (2006.01)
  *G06F 16/22*    (2019.01)
  *G06Q 50/00*    (2012.01)
  *G06F 21/57*    (2013.01)
(52) U.S. Cl.
  CPC ......... *G06Q 50/01* (2013.01); *H04L 63/1408* (2013.01); *G06F 2221/034* (2013.01); *H04L 2463/144* (2013.01)

(56) References Cited

U.S. PATENT DOCUMENTS

| | | |
|---|---|---|
| 2010/0095374 A1 | 4/2010 | Gillum et al. |
| 2011/0247061 A1 | 10/2011 | Loveland et al. |
| 2014/0259156 A1* | 9/2014 | Beutel ................ H04L 63/1416 726/22 |
| 2015/0063556 A1 | 3/2015 | Uba et al. |
| 2015/0135315 A1* | 5/2015 | Ahmed ................ G06F 21/552 726/23 |

OTHER PUBLICATIONS

Zhao et al., BotGraph: Large Scale Spamming Botnet Detection (Year: 2009).*
Keogh et al., Exact indexing of dynamic time warping (Year: 2004).*
Gu et al., BotMiner Clustering Analysis of Network Traffic for Protocol and Structure Independent Botnet Detection (Year: 2008).*
International Search Report, ISA/RU, dated Nov. 24, 2016.

* cited by examiner

SYSTEM AND METHODS FOR DETECTING BOTS REAL-TIME

CROSS-REFERENCE TO RELATED APPLICATIONS

This application claims the benefit of U.S. Provisional Patent Application No. 62/202,442 filed Aug. 7, 2015, incorporated by reference.

FIELD OF THE INVENTION

The invention relates generally to the detection of bots that pretend to be humans on the Internet. More particularly, the invention relates to the detection of bots using a system and methods that differentiates between bot and human interaction based on correlated activity.

BACKGROUND OF THE INVENTION

A "bot" is a software application that runs automated tasks over the Internet. Bots pretend to be human beings and deceive normal users in following them. Bots are used for a plethora of reasons including, for example, to harvest email addresses from contact or guestbook pages, to suck bandwidth, to grab the content of websites such as to re-use it, to buy up concert seats—particularly by ticket brokers who resell the tickets—, to farm for resources, to increase traffic counts on analytics reporting, for example, to extract money from advertisers, or to deceive normal users in following them.

Typically, bots perform tasks that are both simple and structurally repetitive, at a much higher rate than would be possible for a human alone. The largest use of bots is in web spidering, in which an automated script fetches, analyses and files information from web servers at many times the speed of a human. In addition, bots may also be implemented where a response speed faster than that of humans is required (e.g., gaming bots and auction-site robots) or less commonly in situations where the emulation of human activity is required, for example chat bots.

As a specific example, bots may be used to visit real websites run by real companies with real human visitors such that the bots inflate the monetized audience causing advertisers to lose revenue. Bots may be used to commit ad fraud by hijacking browsers to masquerade as real users and blend in with the human traffic to generate more money. Making them more difficult to detect, certain sophisticated bots may be used to move the cursor such as over ads, as well as used to generate cookies to appear more appealing to certain advertisers.

Bots are also fairly common in social media. However, current methods social media sites use to detect and prevent bots are clearly insufficient. For example, it currently takes an average of three days at best for social media sites to detect a bot measured from its day of creation. The longer a bot is active the more abuses it may initiate.

Real-time bot detection is needed because the longer bots are active, the more abuses they initiate. Bot detection methods that work within a day of registration are more desirable than methods that detect after a long time. In addition, bot detection algorithms working on archived data or at one instance of time can miss many bots. For example, bots can delete their tweets after a day or few hours once the tweets are propagated.

Surprisingly there is no work on finding these correlated bots in real-time. Most existing works including Twitter Rules focus on per-account features to classify between fraud and innocent accounts. Reactive and clever account merchants just started mimicking humans to avoid being detected and suspended by these methods. However, humans are slow in activity, while merchants need to keep increasing followers. Therefore, they focus on throughput by creating many accounts that behave like human in the same way. In other words, instead of having one bot account which tweets 10000 times per day, they prefer to have 1000 bot accounts each tweets 10 times per day.

Therefore, real-time bot detection is necessary in order to reduce, if not eliminate, abuses created or initiated by bots. The invention satisfies this demand by tracking correlated activity to detect bots real-time.

SUMMARY OF THE INVENTION

Millions of people interact in social media at any time instance. Even at this large scale, users are not expected to have highly correlated activities in social media for even a small duration, let alone hours. However, there exist user accounts which show perfect correlation in activities for hours. As an example, two completely unrelated (no one follows the other) and yet perfectly correlated social media accounts may appear completely normal if they are investigated individually, but reveal a severe abnormality when their activities are correlated real-time.

Perfectly correlated activities such as those occurring in social media are bot operated as it is not humanly possible even by chance. For example, the chance of two random users posting exactly at the same pair of seconds in an hour is $1/3600^2$. Such an event can happen by chance if there are more than 10 million active users. As an example, if ten posts are found at the same seconds of an hour from two random users, trillions of active users would be needed, an impossible number. Therefore, highly correlated active users cannot be normal users, they must be bot operated. The invention detects groups of users with surprisingly similar activities, for example, in social media. Correlating user activities can lead to the detection of a normal user versus a bot operated user.

Bots are fairly common in social media. Not all bots are bad, however, bots can achieve high number of followers quickly and later, can be used to market or spam information. Many social metrics are calculated on social media data. Significant presence of bots in social media will turn all those metrics useless. Therefore, social media sites such as Twitter strictly suspend such accounts that impersonate and abuse.

According to the invention, events are consumed at 48 Hz to determine maximal user groups whose activities are correlated. Using a scale directed to rate and volume, the invention provides a result that is at least two orders of magnitude larger than existing efforts. In addition, lag-sensitive hashing for temporal data is introduced to achieve accuracy and scalability. Applying the invention to listen to a Twitter stream, bot accounts are detected with perfect precision.

The invention is directed a system and methods that finds highly correlated active users in massive event streams in real-time in which correlated user groups are not desirable such as social media (e.g. Twitter), commenting services (e.g. Disqus) and review systems (e.g. Google Play). In summary, the invention is directed to a system and methods that consumes events, for example at 48 Hz, and outputs maximal user groups whose activities are correlated using a lag-sensitive hashing process for temporal data to achieve accuracy and scalability.

The invention and its attributes and advantages may be further understood and appreciated with reference to the detailed description below of one contemplated embodiment, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which.

DETAILED DESCRIPTION OF EMBODIMENTS OF THE INVENTION

The invention is described in reference to a particular embodiment related to bots and social media applications. However, it is contemplated that the invention may be used to detect bots real-time in any application including for example, advertising fraud, email address harvesting, merchandise (i.e., ticket) purchases, etc.

According to the invention as applied to detecting bots real-time in social media applications, a user performs actions in a temporal sequence. Therefore, an activity signal of a user in social media consists of all the action the user performs in a temporal sequence. Actions include, for example, posting, sharing, liking and deleting. The sequence of time-stamps of a user typically forms a very sparse time series with mostly zero values and occasional spikes representing a number of actions on that specific second. Throughout this discussion, a one second sampling rate is assumed although the invention does not require such an assumption.

Figure 1:
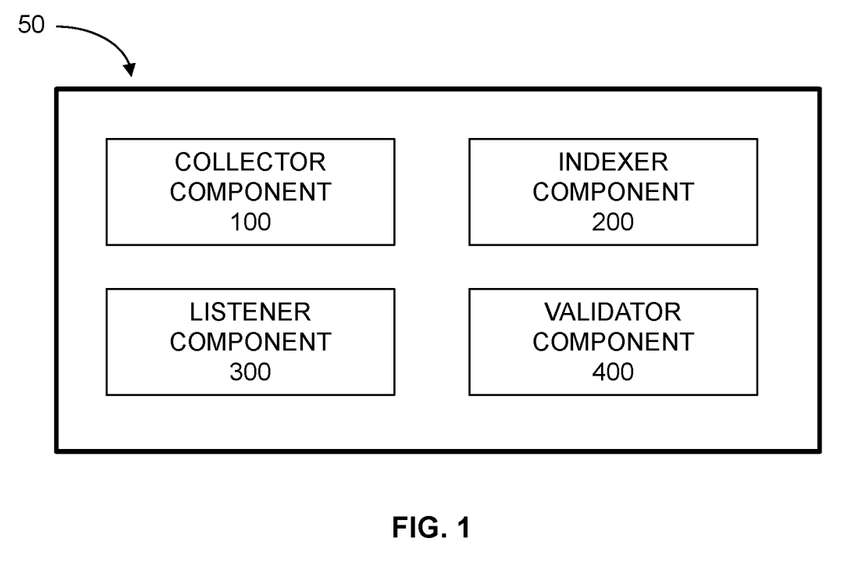
FIG. 1 is a block diagram of the components of the invention.

The framework 50 of the invention is shown in FIG. 1. There are four processor components, each component performing a particular process. The collector component 100 collects activity data as described in further detail in FIG. 3. The indexer component 200 identifies one or more suspicious users based on the collected activity data (see FIG. 4). The listener component 300 closely monitors the activities of the suspicious users' data (see FIG. 5). The validator component 400 ascertains bot accounts with a high significance level while filtering out false positives as described in further detail in FIG. 6. According to the invention, bot and human interaction is differentiated based on correlated activity. Detecting bots real-time can be utilized to ultimately prevent bots from running automated tasks over the Internet, including deceiving normal users in following them.

Figure 2:
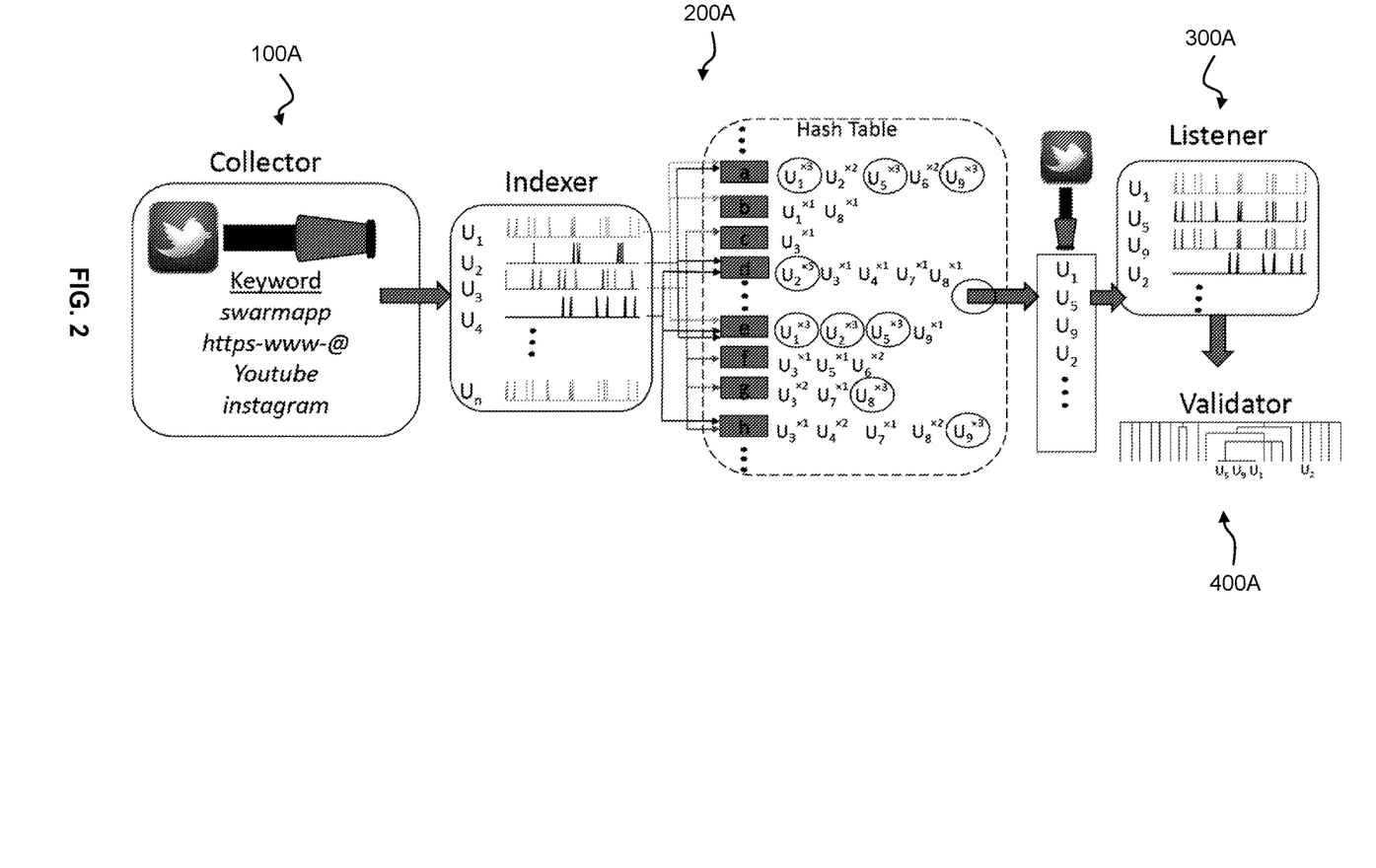
FIG. 2 illustrates bot detection in a social media website according to the invention.

The invention is applied to a social media website as shown more specifically in FIG. 2. The correlation monitoring framework 75 according to the invention is designed to detect bot accounts that are not marked by social media sites in real-time. To work in a never-ending fashion, a report of suspiciously correlated user groups is produced after every T hours. As shown in FIG. 2, the collector component 100A collects tweets that match with a certain set of keywords for T hours. The matching process in Twitter API is quoted from the developer's guide: "The text of the Tweet and some entity fields are considered for matches. Specifically, the text attribute of the Tweet, expanded_url and display_url for links and media, text for hashtags, and screen_name for user mentions are checked for matches." The indexer 200A takes the activity time series of all users as the input and hashes each of them to report suspicious users, i.e., those users that collide in some hash buckets. The set of suspicious users are then listened by the listener to form the activity time series of the suspicious users 300A. The validator component 400A validates the suspicious users. The processes of each component are discussed more specifically in reference to at least FIGS. 3-7.

Figure 3:
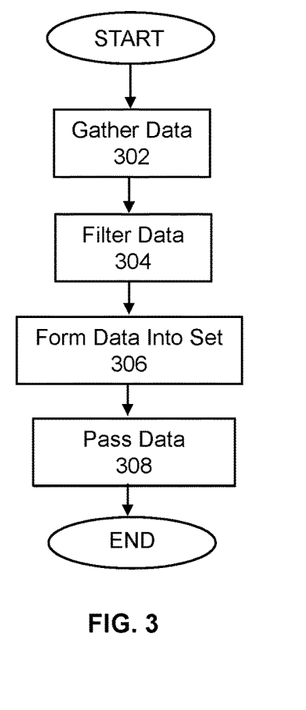
FIG. 3 is a flow chart for the collector component according to the invention.

As shown in FIG. 3, the collector component gathers data of users matching a set of terms for a defined time T at step 302. At step 304, the collector component filters users, for example, by removing those users with data consisting of one instance of a term. The time series of each filtered user is formed into a set of time series by the collector component at step 306. The set of time series is passes to the indexer component at step 308. The collector component forms the uniformly sampled time series for all of the accounts and passes to the indexer filtering users with just one activity because correlating one activity is meaningless.

Figure 4:
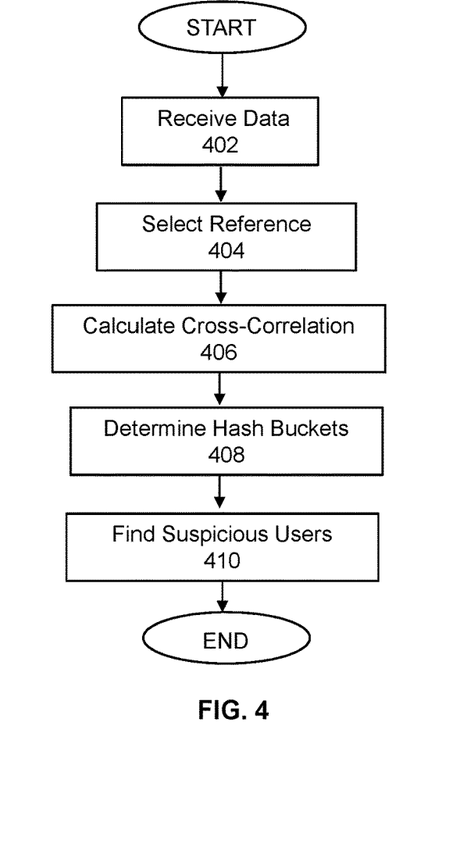
FIG. 4 is a flow chart for the indexer component according to the invention.

As shown in FIG. 4, the indexer component receives the filtered data at step 402 from the collector component and hashes each time series of each user into two or more hash buckets. Specifically, the hash buckets for a given set of time series x are calculated by randomly selecting one of the time series as a reference time series r at step 404. At step 406 the cross-correlation between each time series x and r is calculated. Cross-correlation between two signals produces the correlation coefficients at all possible lags. It is noted that cross-correlation is a good surrogate for warping-invariant measures such as Dynamic Time Warping (DTW). DTW allows signals to translate and warp against one another. Minimizing DTW distance effectively maximizes the warping-invariant correlation such that it is used to compare user activities.

Finally, the index component calculates 2w hash buckets and determines which hash buckets each time series should go into at step 408. Here, w is a user given parameter representing the maximum allowable lag. The hash function is discussed more thoroughly in reference to FIG. 7. Once hashed, the indexer finds a list of qualified suspicious users according to defined qualified users and defined qualified buckets.

According to one embodiment, qualified users are defined as those that have more than $$\left\lfloor \frac{w}{4} \right\rfloor$$

occurrences in a specific bucket. Similarly, qualified buckets have more than $$\left\lfloor \frac{w}{4} \right\rfloor$$

qualified users. Once hashed, the indexer component finds a list of qualified suspicious users at step 410 by going thru each qualified bucket and picking qualified users to report as suspicious users.

Figure 5:
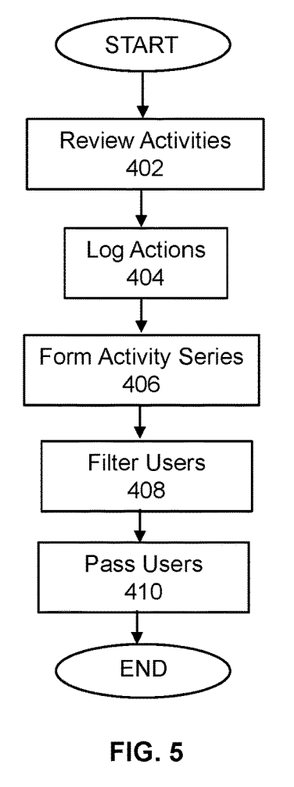
FIG. 5 is a flow chart for the listener component according to the invention.

The set of suspicious users are then listened by the listener component as shown in FIG. 5. The listener component is different from the collector component in that it can receive all the activities or actions of a suspicious user over a period of time (i.e., T hours) as opposed to filtered ones. At step 402, the listener component reviews all activities of a suspicious user. Any action that involves one of the suspicious users anywhere—e.g., text, author, mention, etc.—is logged by the listener component at step 404. The listener component forms at step 406 the activity time series of the suspicious users. At step 408, the suspicious users are then filtered for those with less than a specific number of activities, for example, users with less than ten activities. This is a very important design choice since the chance of two signals with ten or more activities being perfectly correlated over an hour is $10^{-35}$. Therefore, a highly correlated group of users is always a set of bots, possibly managed by the same program. At step 410, the filtered users are passed to the validator component.

Figure 6:
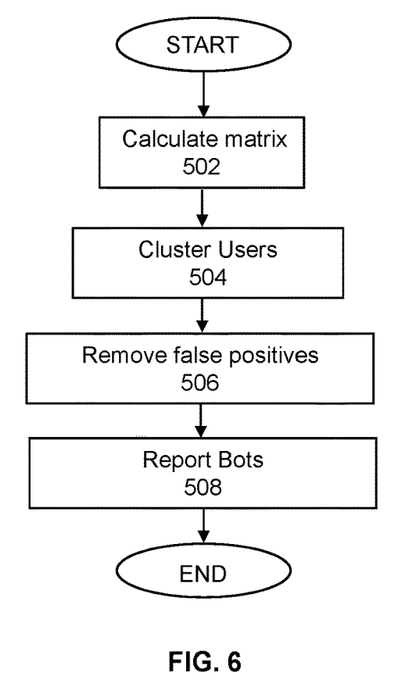
FIG. 6 is a flow chart for the validator component according to the invention.

The validator component validates the suspicious users as shown in FIG. 6. More specifically, the validator component checks the suspicious users to remove false positives in the collection process. According to one embodiment of the invention, Dynamic Time Warping (DTW) correlation is used to capture user similarity in the activity time series. In particular, the validator component calculates a pair-wise DTW distance matrix over the set of users at step 502. At step 504, users are clustered hierarchically up to a very restricted distance cutoff. Every singleton user after clustering is ignored as false positive at step 506 and tightly connected clusters are reported as bots at step 508.

Figure 7:
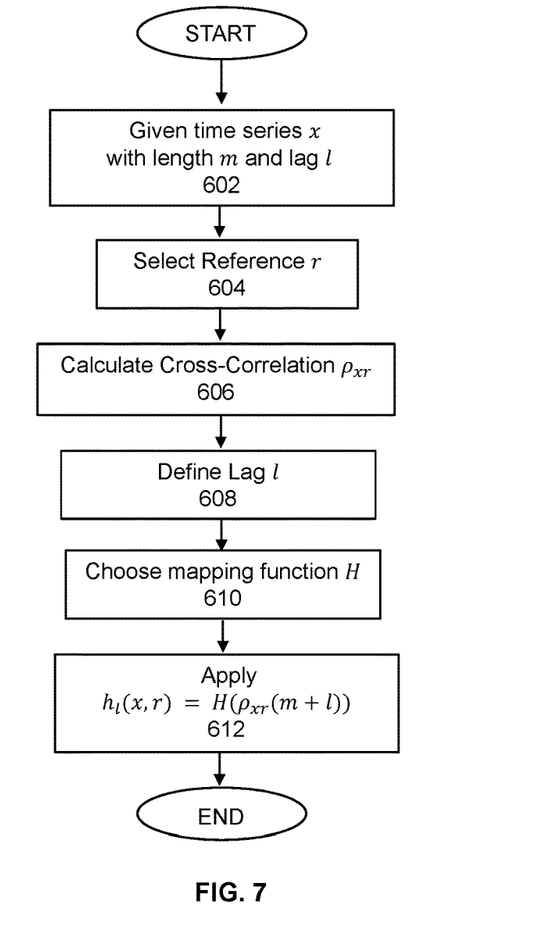
FIG. 7 is a flow chart for the hash function according to the invention.

Each signal x is hashed into 2w buckets according to the hash function of the indexer component discussed more thoroughly in reference to FIG. 7. The lag-sensitive hash function according to the invention guarantees that correlated activities are hashed in multiple buckets reliably. Each signal or time series x has a length m and a lag l as provided at step 602. A randomly picked reference object r is selected as shown by step 604. At step 606, cross-correlation $\rho_{xr}$ is calculated between time series or signal x and reference object r.

At step 608, the lag l is defined. According to one embodiment, the following lag is used to produce the necessary 2w indices of buckets:

$$l \in [-w, w]$$

with w representing the maximum allowable lag as given by a user. H is a mapping function that is chosen at step 610. According to one embodiment, the mapping function is H: $[-1,1] \rightarrow \{1 \ldots B\}$). The choice H depends on the distribution of correlation of the users with respect to r, which can be dynamically estimated, for example, everyday morning and used for the rest of the ay.

At step 612, applying the hash function:

$$h_l(x,r) = H(\rho_{xr}(m+l))$$

results in mapping the correlation coefficient to a bucket index h such that each signal x is hashed into 2w buckets. With cross-correlations $\rho_{xr}$ assumed to be normally distributed, H divides the distribution into B equi-probable regions of the normal distribution whose variance is estimated using past windows. B is the number of buckets in the hash structure.

Once the T hours of collection are over, the hash structure contains users distributed in buckets. The users who collide many times in the same bucket are the most suspicious users. A qualified user is a user whose activity time series is hashed to the same bucket many times $$\left(\left\lfloor \frac{w}{4} \right\rfloor\right).$$

Similarly, a qualified bucket is one that contains more unique qualified users than a threshold $$\left(\left\lfloor \frac{w}{4} \right\rfloor\right).$$

Qualified users are extracted and, as mentioned above, sent to the listener component.

Figure 8:
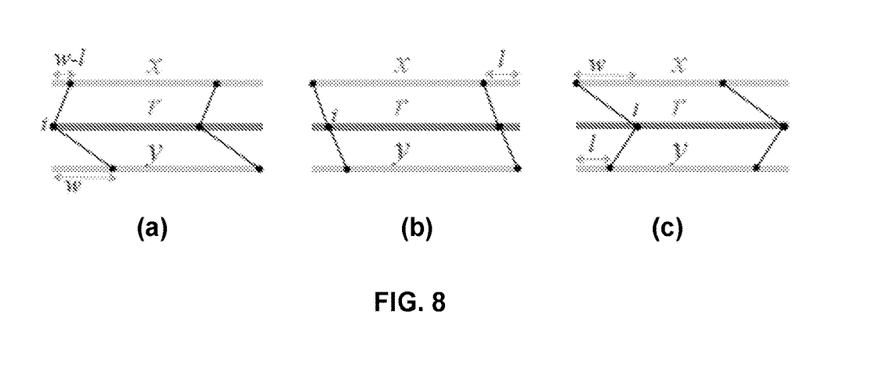
FIG. 8 is an illustration of three different alignments with each producing identical has indices that are perfectly correlated according to the invention.

Turning away from an infinite time series, if w<<T, a large number of collisions may be expected for perfectly correlated time series. For example, if x and y are correlated without any lag, they should collide in all 2w buckets. If they are correlated at the maximum allowable lag w then they should collide at least in w buckets. FIG. 8 illustrates the 2w–1 possibilities of collision illustrating three different alignments (a), (b), (c). As shown, each can produce identical hash indices for x and y that are perfectly correlated at lag l. This redundancy allows lagged correlation to be caught more reliably.

According to the invention, only one reference object is used for one hash structure. It is not a locality sensitive scheme and a lot of spurious collisions can happen for a bad choice of reference object. It is contemplated that more reference objects and more hash structures may be added to reliably prune off spurious collisions.

Although the hash function is described using cross-correlation, it is contemplated that an alternative formulation of the above hash function is possible using cross-covariance instead of cross-correlation, which has identical effect in finding correlated groups.

Turning back to FIG. 2, the correlation monitoring framework 75 according to the invention is designed to detect bot accounts that are not marked by social media sites in real-time.

The invention is applied to a social media website as shown more specifically in FIG. 2. The correlation monitoring framework 75 according to the invention is designed to detect bot accounts that are not marked by social media sites in real-time. The buckets are labeled as a through h as shown by the indexer component 200A. According to this embodiment of the invention w=12 and each user is hashed in these buckets 24 times. The number of occurrence of a user is denoted by the superscript. To qualify, $$\lfloor \tfrac{w}{4} \rfloor = 3$$

occurrences of a user account in the same bucket are needed, e.g., $U_2$ is a qualified user in bucket d. Qualified users are circled as shown in FIG. 2. However, bucket d is not a qualified bucket as it does not have three qualified users. Bucket a and e are qualified buckets because they have three qualified users each. Thus from the shown segment of the hash structure, four suspicious users are extracted as shown by the listener component 300A.

Figure 9:
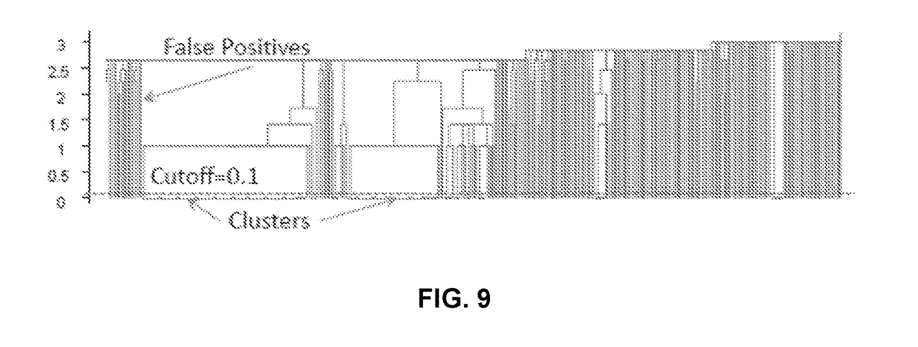
FIG. 9 is a dendrogram of suspicious user activities according to one embodiment of the invention.

The listener component 300A listens to all the activities of these suspicious users and forms new activity time series for the next T hours. Pair-wise constrained DTW distances are calculated for all of these users and a hierarchical clustering is performed on the pair-wise warping distances using a "single" linkage technique. A sample dendrogram of the suspicious user activities is shown in FIG. 9 with clusters and numerous false positives extracted from the hash structure. As seen in FIG. 9, only a few users fall below the restricted cutoff with the rest of the users cleared as false positives. It should be noted that the windows size for constrained DTW is the same as the lag parameter w.

A very strict cutoff threshold is used to extract highly dense clusters and all the remaining singleton users are ignored. According to one embodiment, the cutoff used is a DTW distance of 0.1 which is equivalent to a warping-invariant correlation of 1.0. The extracted clusters contain bot accounts by definition. Each cluster also contains semantically similar user accounts.

As more periods of T hours pass, clusters can be merged to form bigger clusters. This is an important step because bots form correlated groups and may disband them dynamically. Therefore, an already detected bot can reveal a new set of bots in the next T hour period. Two clusters may be merged if they share one user in common—such a simple method can retain high precision because of overwhelming number of existing bots.

Large clusters are generated by the merging process. Typically, large clusters contain highly regular behaviors. For example, a big cluster is found of 2427 user accounts that tweet one tweet every one or two seconds. All these accounts are bots for their too accurate periodicity, however, some of them may not be as harmful as others such as those with a fixed periodicity. Smaller clusters show more human-like behavior from impersonating accounts.

Detailed experimental validation is provided below. In particular, the experiments were performed on commodity computers running Ubuntu 12.04 with Intel Core i7 processor and 32 GB of memory using the streaming data that Twitter publicly provides, although it is contemplated that the invention is applicable to any streaming Application program interface (API). Three inter-dependent parameters are given as follows: number of buckets (B=5000), base window (T=2 hours) and maximum lag (w=20 seconds). Unless otherwise specified, the default parameters are used with all the numbers averaged over five runs at different times of the day. The impact on filter strength, bot detection, cluster quality, parameter sensitivity, and scalability is provided from the experimental validation.

Figure 10:
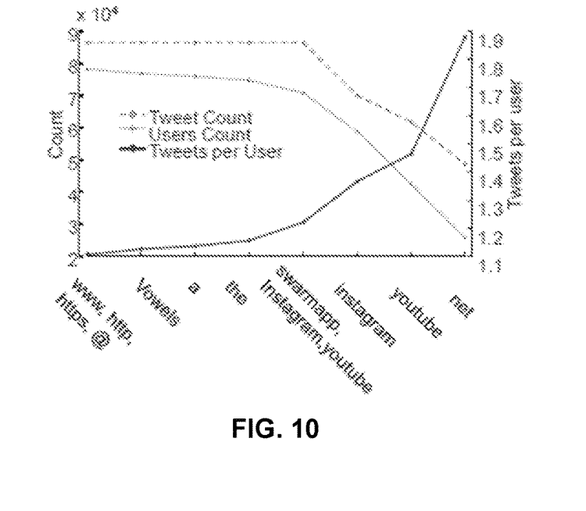
FIG. 10 is a graph of experimental validation results directed to filter strings in order of tweets-per user.

Turning to the impact of filter strings on the number of activities and the number of user accounts collected, FIG. 10 shows the results for eight different filter strings in the order of number of tweets-per-user providing a general idea about the strengths of these strings. An "or" filter of internet keywords ("www—http—https—@") is found to be more general (i.e. matches more activities) than the "vowel" filter ("a-e-i-o-u") which emphasizes the prominence of tweets containing urls and email addresses. The same order of the strings in the x-axis is used to represent the general-to-specific trend.

As can be seen, tweets-per-user increases for more specific filter strings essentially describing the tradeoff between number of users and tweets-per-user for correlation purposes. If more users with to be correlated, the time series will be more sparse degrading the quality. Selecting the filter strings based on the exploration for bots in Twitter, third party sharing services (video, image, location, etc.) are shown to be commonly used to create automated tweets.

Figure 11:
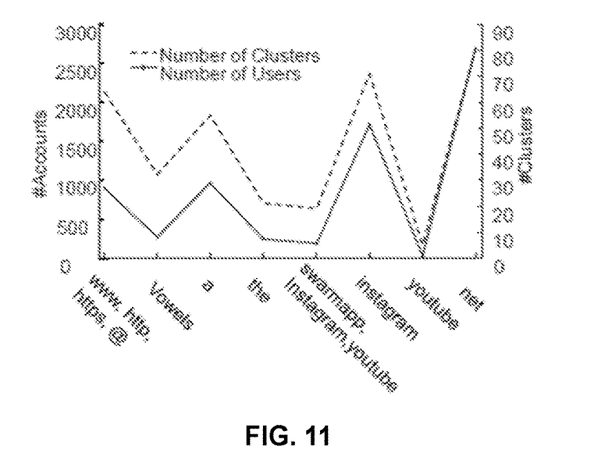
FIG. 11 is a graph of experimental validation results directed to clusters found for different filters.

For example, the swarm application provides services to post check-ins for attractions, restaurants, etc. Benign strings such as "a", "the" and domain such as "net" are also covered. The invention is ran for T=2 hours on each of these filters to calculate the number of clusters and number of bot accounts detected. As shown in FIG. 11, the general-to-specific trend does not hold in terms of clusters and bot accounts and it is found that "instagram" and "net" detect the largest number of dusters and bots. It is found that "youtube" and its superset detect a few bots. Thus, the invention can find thousands of correlated users every couple of hours using a good filter string noticing that the number of clusters and the number of bots are very correlated to each other irrespective of the general-to-specific trend.

The invention produces a set of clusters of highly correlated users based on just the temporal similarity. As mentioned above, correlated users who have more than ten activities in T hours are found. Any highly correlated group (>0.99 correlation) cannot appear at random and certainly disclose a bot-family. To assess the accuracy of the invention, context of other methods is considered such as comparing the invention with a per-user method on temporal data and a cross-user method on text and authors of the tweets.

Figure 12:
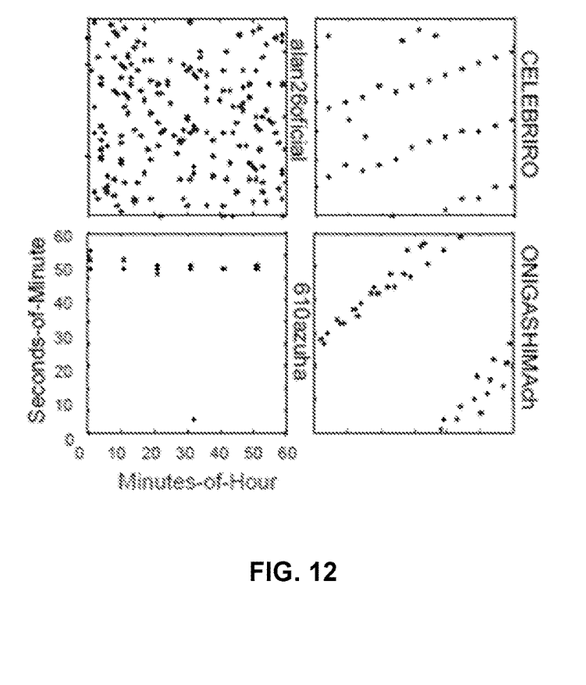
FIG. 12 is a plot of experimental validation results directed to different patterns of bots.

First, the invention is compared to an existing per-user method which uses the dependence between minute-of-an-hour and second-of-a-minute as an indicator for bot accounts. For example, FIG. 12 shows a set of bots and their second-of-minute vs. minute-of-hour plots. Testing the independence of these two quantities using the $X^2$-test, a bot is declared if there is any dependence. While the $X^2$-test method fails for a particular user because of independence among the quantities, the invention can detect the same user as a bot.

Figure 13:
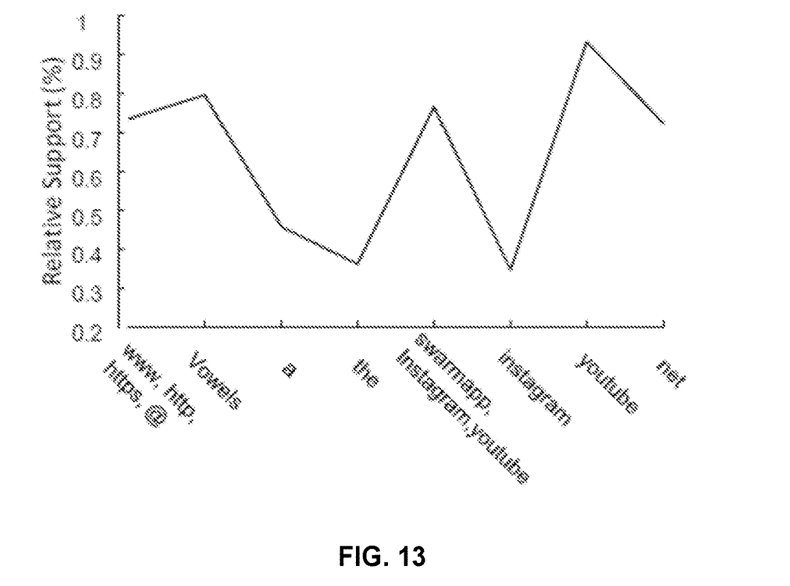
FIG. 13 is a graph of experimental validation results directed to support of the $X^2$-test method and the invention.

Calculating the percentage of the bots that the invention detects and that can also be detected by the $X^2$-test for every filter string, it is found that the higher the percentage, the less promising the invention as shown by the results in FIG. 13. As can be seen in FIG. 13, the best result is for the "instagram" filter detecting three times more bots. The worst result is for the "youtube" filter noting only a small number of clusters detected.

Figure 14:
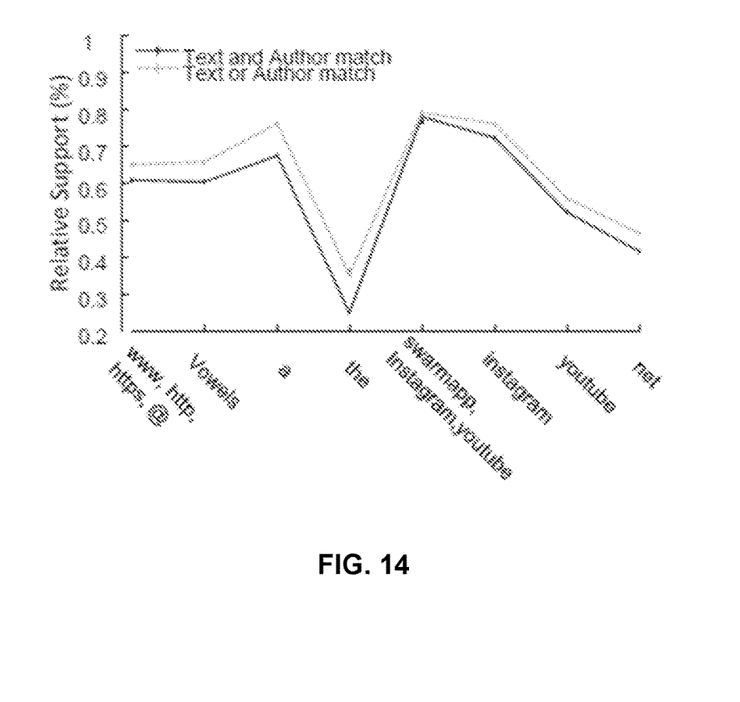
FIG. 14 is a graph of experimental validation results directed to support of the cross-user textual method and the invention.

Using cross-user text and author matching, the relative accuracy is evaluated using contextual information such as tweet-text and tweet-authors. The quality measure "botness" of a cluster is defined as the average of the "botness" of all the pairs of accounts in the cluster. For a given pair, "botness" is the percentage of identical tweets over a window. The higher the "botness", the more support the invention gets from the context. As shown in FIG. 14, up to 80% support is achieved from the context when text and/or authors of the tweets are matched. There is a very little difference between "and" and "or" configuration suggesting that most of the time tweets and authors match together. However, less support from the context does not necessarily mean the invention is detecting false positives as many users are seen that correlate in time but do not have identical tweets. For example, two twitter users posting a sequence of different tweets at identical time-stamps.

Figure 15:
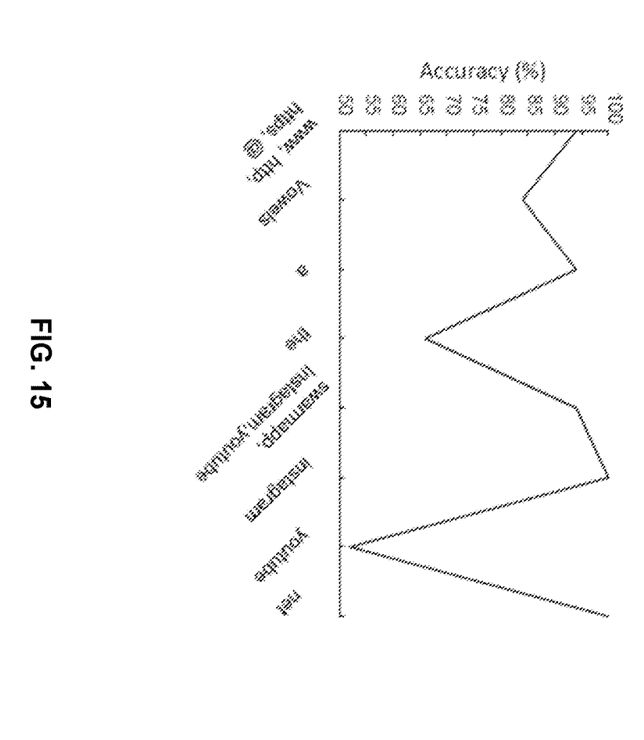
FIG. 15 is a graph of experimental validation results directed to human measure of the similarity between bot pairs detected in the same cluster.

To determine relative accuracy within cluster consistency, Amazon Mechanical Turk is used to evaluate fifty random pairs of accounts from different clusters to determine if they are similar. The ways two accounts can be similar may be based, for example, on text, url, timestamp and language similarities. The results are shown in FIG. 15 with 100% accuracy for "instagram" and "net" filters. As before the "youtube" filter is shown to be the worst performer.

Now turning to the analysis of three inter-dependent parameters iterations over each parameter are performed while the remaining parameters are fixed. According to this experimental validation, the following keywords "swarmapp—youtube—instagram") are used as the filter string.

Figure 16:
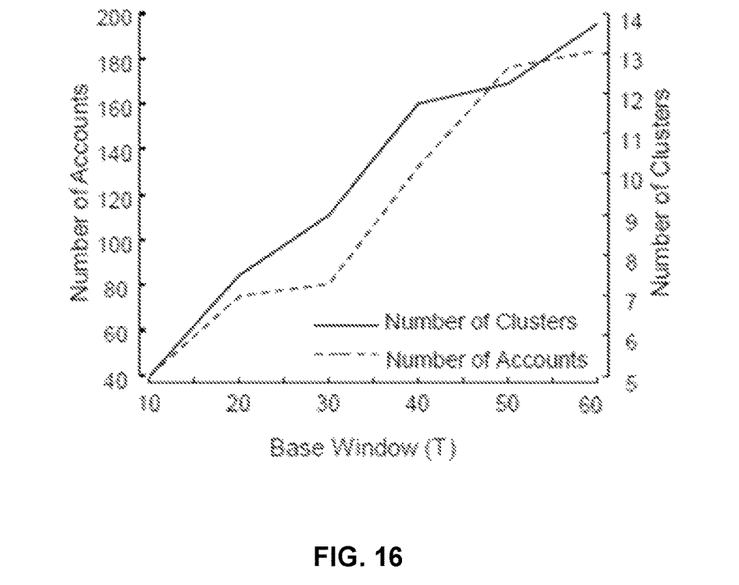
FIG. 16 is a graph of experimental validation results directed to the effect of base window parameters on the detection performance.

First, the size of the base window T is changed to observe the change in detection performance. A consistent growth in number of clusters and bot accounts can be seen with a larger base window ensuring more correlated users show up to be hashed. The end effect is higher quality clusters at the expense of a longer wait as can be seen in FIG. 16.

Figure 17:
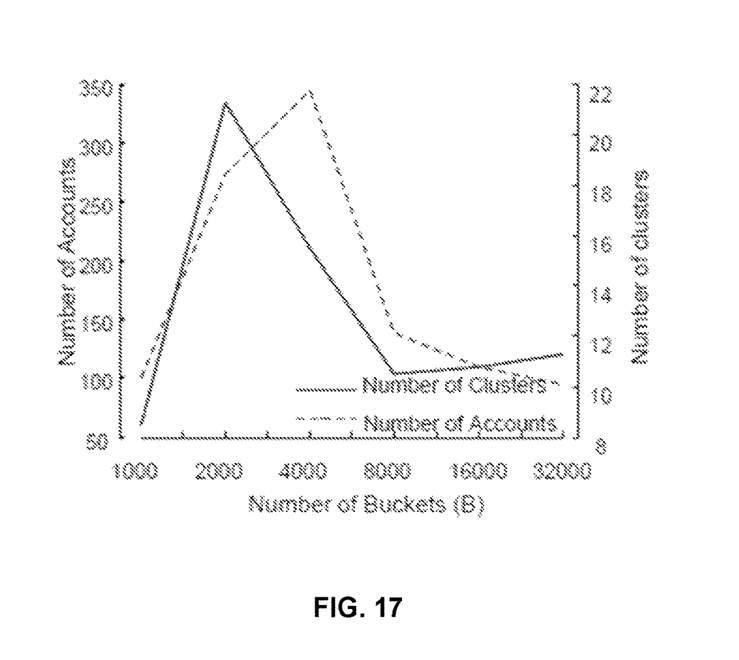
FIG. 17 is a graph of experimental validation results directed to the effect of number of bucket parameters on the detection performance.

Second, the number of buckets B in the hash structure is changed. Too few buckets induce unnecessary collisions while too many buckets spread users sparsely. FIG. 17 shows the maximum number of clusters and bot accounts that can be achieved by using 2000 to 4000 buckets.

Figure 18:
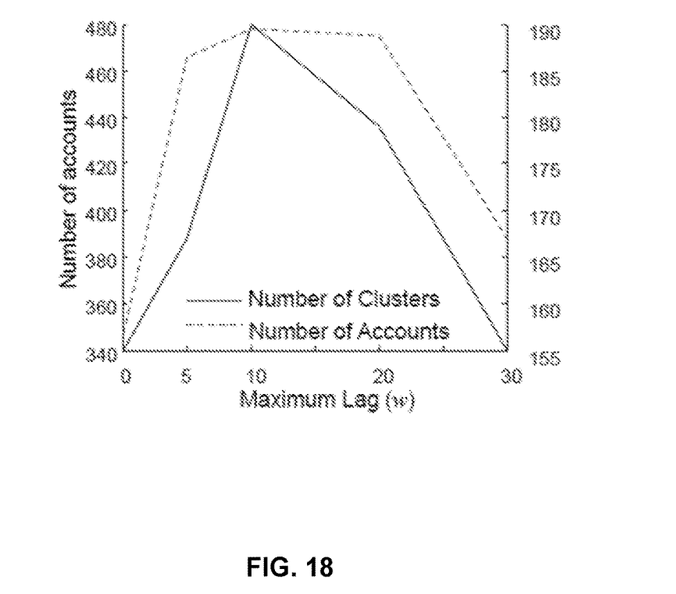
FIG. 18 is a graph of experimental validation results directed to the effect of maximum lag parameters on the detection performance.
Figure 19:
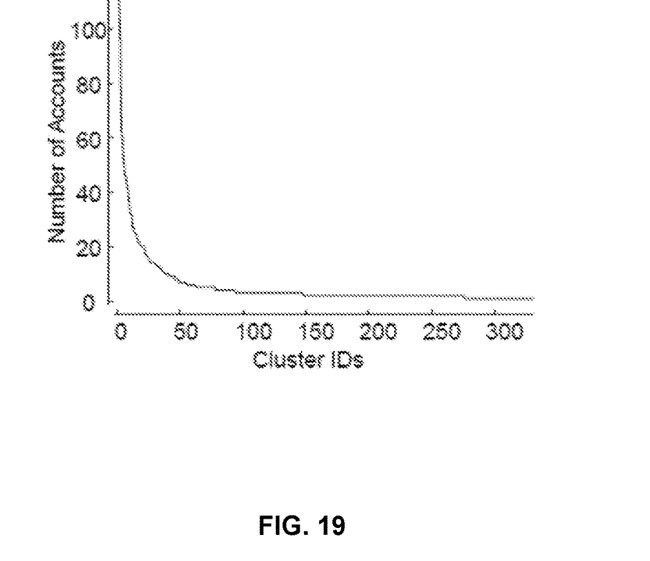
FIG. 19 is a graph of experimental validation results directed to cluster sizes in sorted order.

Lastly, maximum lag w is reviewed, specifically, the impact of maximum lag over detection performance. FIG. 18 is a graph of experimental validation results directed to the effect of maximum lag parameters on the detection performance. FIG. 19 is a graph of experimental validation results directed to cluster sizes in sorted order. User activities require lag and a warping sensitive correlation measure. For zero lag (essentially Euclidean distance), significantly less clusters and bot accounts are obtained. For the lag of 30 seconds, the number of clusters is again low because the hash structure is crowded with copies of each user, resulting in lots of spurious collisions.

Although scalability for real-time methods is hard to quantify because of having more than one degree of freedom, two quantities are always involved—data rate and window size. Fortunately, Twitter streaming API has a hard-limit on the data rate receiving tweets at 48 tweets-per-second rate at the most. Therefore, scalability depends on the amount and analysis of stored history, which is considered parameter T in the problem definition. One million user accounts are used since this is a massive number of time series to calculate warping-invariant correlation for all-pairs. Calculating pair-wise DTW for a million users is equivalent to a trillion distance calculation without overlapping substructure. However, the sparsity of the signals is exploited, which enables the hashing algorithm of the invention to calculate clusters.

According to one example, it takes T=9.5 hours to collect 1 million users. The indexer then takes 40 minutes to hash all the users of which 24,000 users are qualified for the listener and the validator detects 93 clusters of 1485 accounts. The invention can listen to a million users using one machine for half a day and find bots in the remaining time of a day. Thus, the invention can be deployed to produce a daily report on bot accounts analyzing the activities in the previous day.

The invention can detect account registered by account merchants, such as those that may be sold to miscreants and thus, the invention can detect bots soon-after-registration to prevent future abuse. Detecting bots by correlating users can identify bot accounts that may potentially become spammers.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A system for detecting bot accounts comprising:
   a collector component configured to collect activity data for each user account and form a first activity time series based on the collected activity data for the each user account;
   an indexer component configured to hash each of the first activity time series to identify one or more suspicious users based on the collected activity data;
   a listener component configured to monitor activity data of the one or more identified suspicious users, wherein the listener component forms a second activity time series of all the monitored activity data for each of the one or more identified suspicious users, the listener component further configured to filter the one or more identified suspicious users for those with the second activity time series having less than a specific number of activities; and
   a validator component configured to ascertain one or more bot accounts of the one or more filtered suspicious users with the monitored activity data that forms part of a cluster.

2. The system for detecting bot accounts according to claim 1, wherein the collector component collects the activity data based on a predefined keyword appearing within a stream of social activities in real-time.

3. The system for detecting bot accounts according to claim 1, wherein the indexer component takes the first activity time series of each user account and hashes using a lag-sensitive hash function the first activity time series into multiple hash buckets with the one or more identified suspicious users defined as qualified users colliding in a qualified hash bucket.

4. The system for detecting bot accounts according to claim 3, wherein the qualified users are those that have more than $$\left\lfloor \frac{w}{4} \right\rfloor$$

occurrences, wherein w represents a user given parameter of a maximum allowable lag.

5. The system for detecting bot accounts according to claim 3, wherein qualified hash buckets are those that have more than $$\left\lfloor \frac{w}{4} \right\rfloor$$

qualified users, wherein w represents a user given parameter of a maximum allowable lag.

6. The system for detecting bot accounts according to claim 3, wherein the hash function is:

$$h_l(x,r) = H(\rho_{xr}(m+l))$$

with h representing a bucket index, x representing the first time series of each signal with a length m, r representing a randomly picked reference of a same length, $\rho_{xr}$ representing cross-correlation between x and r at lag l, H is a function converting the cross-correlation into an index to a bucket in a hash table with B representing a number of buckets in a hash structure.

7. The system for detecting bot accounts according to claim 1, wherein the validator component validates the one or more identified suspicious users as true or false based upon a pair-wise Dynamic Time Warping (DTW) distance matrix and a hierarchical clustering algorithm over the one or more identified suspicious users.

8. The system for detecting bot accounts according to claim 1, wherein the specific number of activities is less than 10 activities.

9. A process for detecting bot accounts comprising the steps of:
collecting by a collector component activity data, wherein the collecting step further comprises the steps of:
gathering activity data of one or more users matching a set of terms for a defined time period,
filtering the one or more users by removing those users with the gathered activity data consisting of one instance of a term,
forming filtered data as a set of activity time series of all remaining users responsive to the filtering, and passing the filtered data to an indexer component;
identifying by the indexer component one or more suspicious users by hashing each activity time series of the set of activity time series;
monitoring by a listener component activity data including the collected activity data of the one or more identified suspicious users; and
ascertaining by a validator component the monitored activity data forming part of a cluster to identify one or more bot accounts of the one or more identified suspicious users.

10. The process for detecting bot accounts according to claim 9, wherein the identifying step further comprises the steps of:
receiving by the indexer component the filtered data;
selecting a reference activity time series randomly from the set of activity time series;
calculating a cross-correlation between each activity time series of the set activity time series and the reference activity time series;
determining one or more hash buckets for each activity time series of the set of activity time series; and
finding qualified suspicious users within each hash bucket of the determined one or more hash buckets.

11. The process for detecting bot accounts according to claim 10, wherein the qualified suspicious users have more than $$\left\lfloor \frac{w}{4} \right\rfloor$$

occurrences in a hash bucket, with w representing a user given parameter of a maximum allowable lag.

12. The process for detecting bot accounts according to claim 9, wherein the monitoring step further comprises the steps of:
receiving all activities or actions of the one or more identified suspicious users over a period of time;
reviewing all activities of the one or more identified suspicious users;
logging one or more actions of the one or more identified suspicious users;
forming an activity time series of the one or more identified suspicious users; and
filtering the one or more identified suspicious users for those with less than a specific number of activities.

13. The process for detecting bot accounts according to claim 9, wherein the ascertaining step further comprises the steps of:
checking the one or more identified suspicious users to remove false positives;
calculating a pair-wise Dynamic time Warping (DTW) distance matrix over a set of users;
clustering hierarchically the set of users to a restricted distance cutoff;
ignoring each singleton user as a false positive; and
identifying connected clusters as bots.

14. A system for detecting bot accounts comprising:
a collector component configured to collect activity data from a set of users to form an activity time series for each user of the set of users;
an indexer component configured to identify one or more suspicious users by hashing the activity time series for each user of the set of users;
a listener component configured to monitor activities of the one or more identified suspicious users; and
a validator component configured to ascertain one or more bot accounts of the one or more identified suspicious users identified by the monitored activities that form a part of a cluster, wherein the validator component identifies the bot accounts as true or false based upon a pair-wise Dynamic Time Warping (DTW) distance matrix and a hierarchical clustering algorithm over the one or more identified suspicious users.

15. The system for detecting bot accounts according to claim 14, wherein the listener component forms an activity time series of each of the one or more identified suspicious users and the one or more identified suspicious users are filtered for those with less than a specific number of activities.

16. The system for detecting bot accounts according to claim 14, wherein the collector component collects the activity data based on a predefined keyword appearing within a stream of social activities in real-time.

17. The system for detecting bot accounts according to claim 14, wherein the indexer component takes the activity time series of each user of the set of users and hashes using a lag-sensitive hash function the activity time series of each user of the set of users into multiple hash buckets with the one or more identified suspicious users defined as qualified users colliding in a qualified hash bucket.

18. A process for detecting bot accounts comprising the steps of:
    collecting by a collector component activity data from one or more users to form a set of activity time series for each user of the one or more users;
    identifying by an indexer component one or more suspicious users by hashing the set of activity time series for each user of the one or more users, wherein the hashing step further comprises the steps of:
        receiving by the indexer component the set of activity time series for each user of the one or more users,
        selecting a reference activity time series randomly from the set of activity time series for each user of the one or more users,
        calculating a cross-correlation between each activity time series of the set of activity time series for each user of the one or more users and the selected reference activity time series,
        determining one or more hash buckets for each activity time series of the set of activity time series for each user of the one or more users, and
        finding qualified suspicious users within each hash bucket of the determined one or more hash buckets;
    monitoring by a listener component activity data of the one or more identified suspicious users; and
    ascertaining by a validator component the monitored activity data forming part of a cluster to identify one or more bot accounts of the one or more identified suspicious users.

19. The process for detecting bot accounts according to claim 18, wherein the collecting step further comprises the steps of:
    gathering the activity data of the one or more users matching a set of terms for a defined time period;
    filtering the one or more users by removing those users with the gathered activity data consisting of one instance of a term;
    forming filtered data as a set of activity time series of all remaining users responsive to the filtering; and
    passing filtered data to the indexer component.

20. The process for detecting bot accounts according to claim 18, wherein the monitoring step further comprises the steps of:
    receiving all activities or actions of the one or more identified suspicious users over a period of time;
    reviewing all activities of the one or more identified suspicious users;
    logging one or more actions of the one or more identified suspicious users;
    forming an activity time series of the one or more identified suspicious users; and
    filtering the one or more identified suspicious users for those with less than a specific number of activities.

* * * * *